July 8, 1969 V. P. CAGGIA 3,453,883
PRESSURE ACTUATED MACH/AIRSPEED INSTRUMENT FOR PRODUCING
A LINEARIZED, ELECTRICAL MACH OUTPUT
Filed May 5, 1967 Sheet 1 of 3
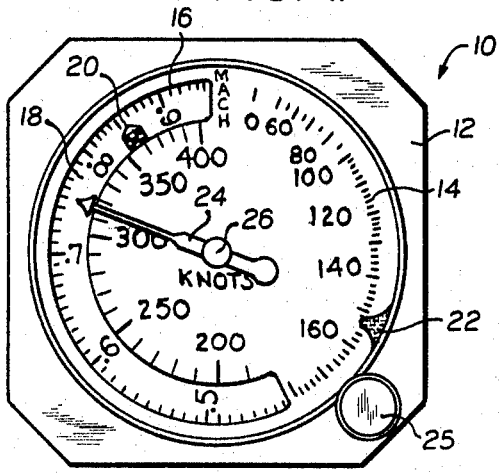
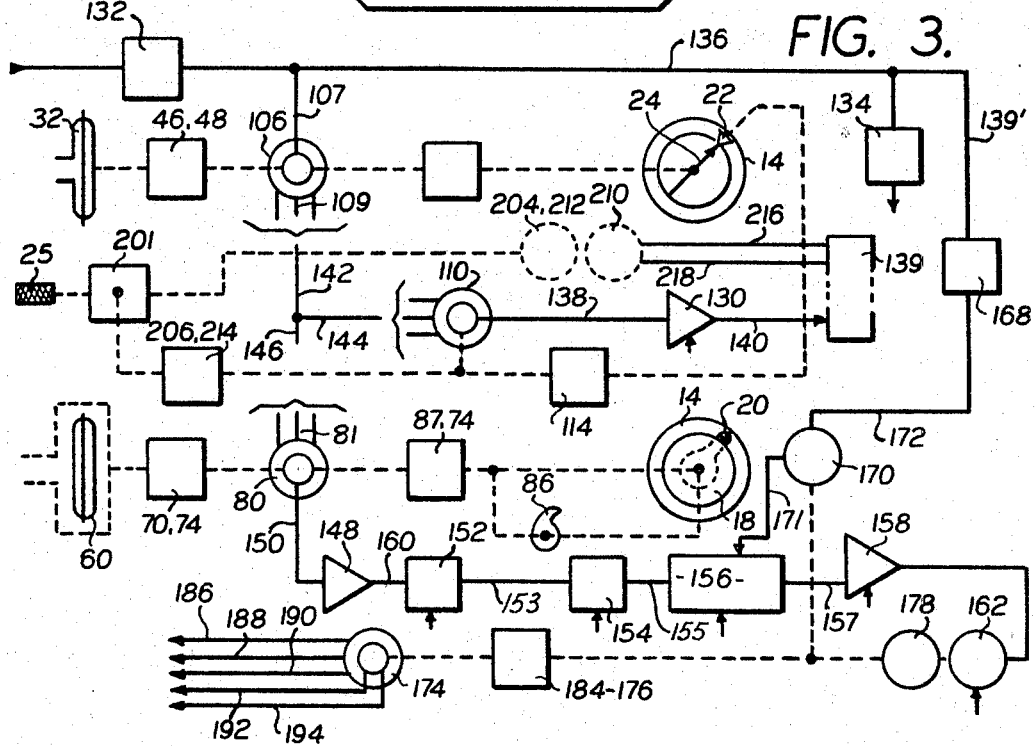
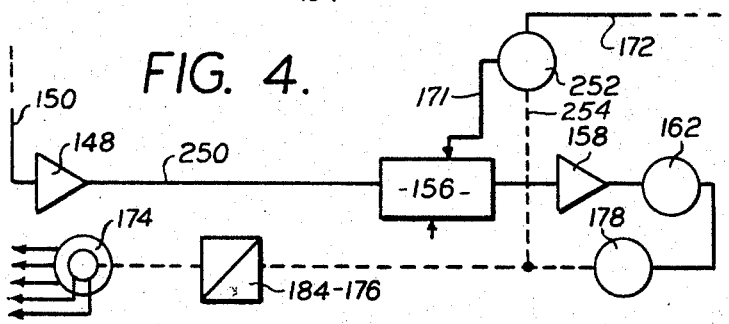
INVENTOR
VINCENT P. CAGGIA
BY
ATTORNEYS.

United States Patent Office 3,453,883
Patented July 8, 1969

3,453,883
PRESSURE ACTUATED MACH/AIRSPEED INSTRUMENT FOR PRODUCING A LINEARIZED, ELECTRICAL MACH OUTPUT
Vincent P. Caggia, River Vale, N.J., assignor to Lear Siegler, Inc., Armonk, N.Y., a corporation of Delaware
Filed May 5, 1967, Ser. No. 636,310
Int. Cl. G01c 21/00
U.S. Cl. 73—182
20 Claims

ABSTRACT OF THE DISCLOSURE

A combined airspeed and Mach indicator has a means for generating an electrical output signal which is proportional to the Mach number of the aircraft. The generating means includes means for linearizing said output signal to provide a synchro type output that is compatable with an on-board data computer.

BACKGROUND OF THE INVENTION

Field of the invention

The present invention relates to a combined airspeed and Mach indicator having electrical output means for generating a signal proportional to the Mach number and means for linearizing said signal.

SUMMARY

In the herein disclosed preferred embodiment, the instrument of the invention takes the form of a combined airspeed and Mach indicator to provide the pilot of a high speed, subsonic aircraft with indicated airspeed, Mach number, and maximum allowable airspeed by means of a single dial presentation. Means are provided to generate an electrical output signal which is proportional to a function of M, where M equals the Mach number, and to linearize said output signal and provide a synchro type output based thereon to the interface of an on-board air data computer. In addition, reference index marker means are provided and may be set manually by external setting means. The index marker means are linked mechanically to an electrical-position transducing device from which an airspeed hold error signal may be derived and amplified for proper output to on-board automatic throttle control means. Means may also be included to provide for electrical slewing, or synchronization, of the said index marker means as an integral part of the airspeed hold system.

BRIEF DESCRIPTION OF THE DRAWINGS

FIG. 1 is a front view of the instrument dial of a combined airspeed and Mach indicator embodying the present invention;

FIG. 3 is a block diagram of the instrument of FIG. 2;

FIG. 4 is a fragmentary block diagram of a modified portion of the instrument.

DESCRIPTION OF THE PREFERRED EMBODIMENTS

Figure 2:
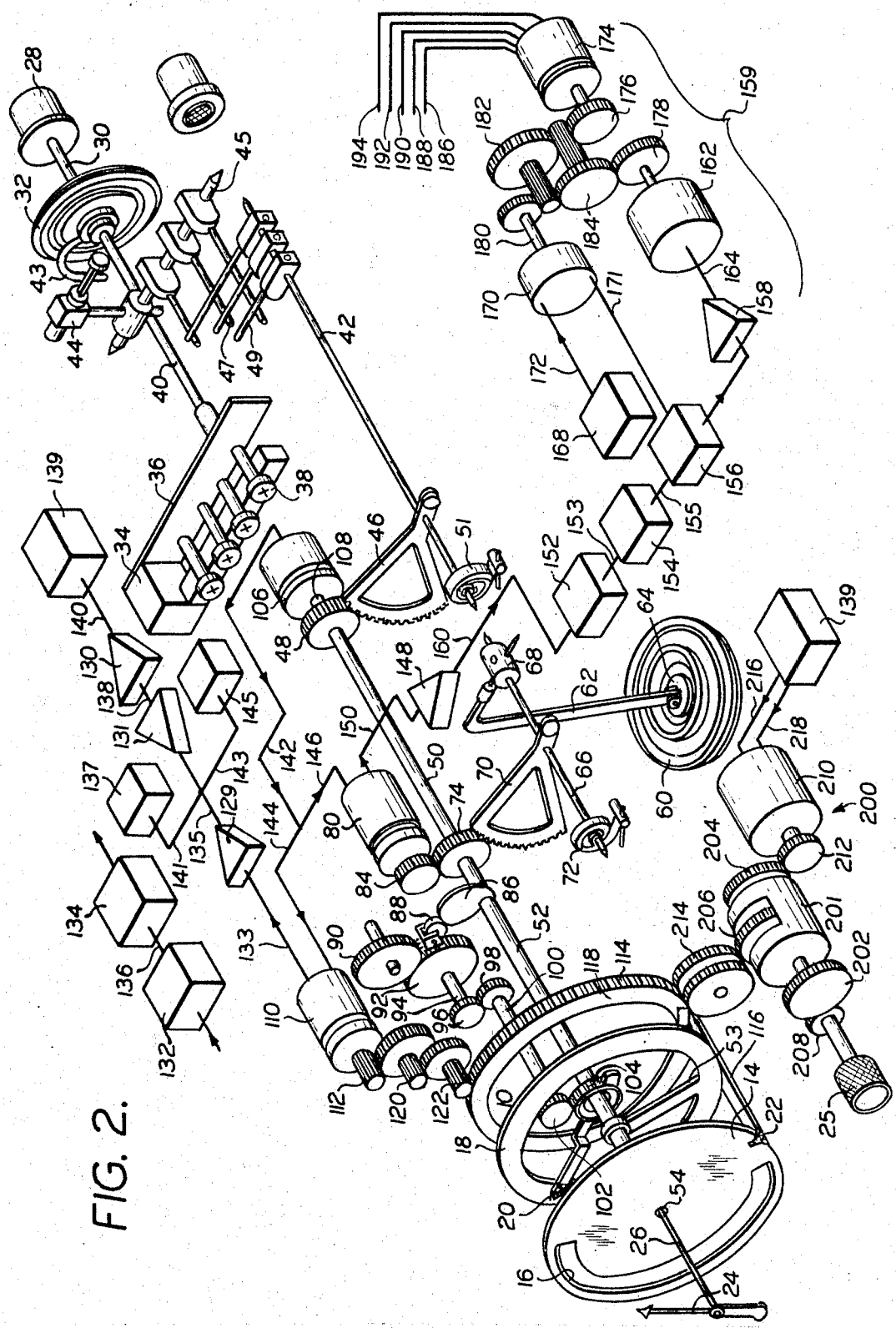
FIG. 2 is an exploded perspective view of the instrument of FIG. 1 including a schematic block diagram of the electrical circuit associated therewith.

Referring now to FIG. 1, a linearized Mach/airspeed indicator is generally indicated at 10, and comprises a case 12 to contain the instrument of the invention and enable the convenient mounting of the former in the instrument panel of an aircraft. Although by no means limited thereto, it is noted that the system of the invention is particularly adapted for use in high speed, subsonic aircraft. A main or airspeed dial 14 is fixedly positioned within an opening provided therefor in the housing 12, and is provided with calibrated indicia, as indcated, in knots, with the said indicia being expanded in the 60 to 180 knot range to provide very desirable readability in 1 knot increments during aircraft take-off and landing procedures which would normally be carried out in this speed range.

A cut-out 16 of the depicted, generally semi-annular configuration is provided as shown in the airspeed dial 14 to make visible a corresponding portion of a Mach sub-dial 18 which is positioned behind the said airspeed dial and rotatable thereto in response to changes in aircraft altitude in the manner described in detail hereinbelow. The Mach sub-dial 18 is calibrated as shown in .01 Mach increments, and a maximum allowable airspeed pointer 20 extends thereover and is movable relative thereto in response to changes in aircraft altitude in the manner described in detail hereinbelow.

A setting marker or command bug 22 extends as shown over the outer edge portion of the airspeed dial 14 for setting at a desired airspeed through the medium of setting knob shaft assembly 25, again in the manner described hereinbelow.

An airspeed pointer 24 is rotatably supported from the center of the airspeed dial 14 by an airspeed pointer shaft assembly 26 which extends through the latter, and the said airspeed pointer is movable relative to the said airspeed and Mach dials in response to changes in airspeed as described in detail hereinbelow. Thus, it is believed apparent that the airspeed pointer 24 will function to simultaneously indicate airspeed on the airspeed dial 14 and the Mach number corresponding to such airspeed on the portion of the Mach sub-dial 18 which is visible through the cut-out 16. In addition, the maximum allowable airspeed pointer 20 will, at the same time, indicate maximum allowable airspeed.

Referring now to FIGS. 2 and 3, a pressure sensitive pitot assembly, of generally conventional construction, is indicated at 28 and is connected, through impact pressure transmitting tube 30, to an airspeed diaphragm 32. For operational use of the instrument of my invention, the pitot assembly 28 will, of course, be so disposed on the aircraft surface so that the impact pressures generated in the former by the movement of the aircraft through the air will be representative of airspeed. A calibration block 34, including a restraining spring 36 and calibrating screws 38 is mechanically interconnected as shown to airspeed diaphragm 32 by virtue of push rod 40 extending therebetween whereby calibration of the said diaphragm may be readily effected through the convenient adjustment of the said calibrating screws.

An airspeed sector shaft 42 is journaled in non-illustrated end bearings and is coperatively associated as shown with airspeed diaphragm 32 by virtue of U-shaped member 43, arm and rod assembly 44, an airspeed diaphragm rocking shaft 45, and abutting levers 47 and 49, respectively, extending therebetween, whereby longitudinal movement of the surface of airspeed diaphragm 32 will result in rotation of airspeed sector shaft 42 in the generally conventional manner described in detail, for example, in U.S. Patent 3,257,845 and co-pending application for U.S. patent, Ser. No. 557,734, filed June 15, 1966 and assigned to the assignee hereof. A biasing spring 51 is connected to the airspeed sector shaft 42 adjacent one extremity of the latter and functions to continuously bias it in the counterclockwise direction and prevent backlash in the operation thereof.

An evacuated aneroid diaphragm of generally conventional construction is indicated at 60 and includes a motion transmitting arm 62 which is pivotally affixed to the central portion of the former through mounting means 64 extending therebetween. The aneroid diaphragm 60 functions, of course, to sense static pressure changes, it being noted that provision is made in the case 12 in which the instrument of my invention is housed to introduce the ambient static pressure at the altitude at which the aircraft is flying to the external surfaces of the said aneroid diaphragm to enable the ready sensing of static pressure changes thereby.

A sector shaft 66 is connected as shown to the remote extremity of the motion transmitting arm 62 by readily adjustable connecting means 68, and the said sector shaft includes a drive gear segment 70 fixedly secured thereto for rotation therewith. In addition, the said sector shaft is biased to a very slight degree in the counter-clockwise direction by anti-backlash spring biasing means 72 which is affixed thereto in conventional manner, adjacent one extremity thereof.

The drive gear segment 70 meshes with a driven gear 74 which is in turn fixedly secured to one extremity of the hollow shaft Mach 52. Connecting means as indicated at 53 are provided to connect the Mach sub-dial 18 and the generally adjacent portion of the Mach shaft 52 whereby may be readily understood that rotation of the latter will result in corresponding rotation of the former.

Electrical-position transducing means in the nature of synchro means which preferably take the form of an altitude Syntrol are indicated at 80 and include a rotor drive shaft extending therefrom and terminating in a driven gear 84. The driven gear 84 is meshed as shown with the driven gear 74 of the shaft 52 whereby rotation of the latter will result in a proportional rotation of the rotor of the said altitude Syntrol.

A limit speed cam 86 is fixedly secured to the shaft 52 and a cam follower 88 is provided to sense rotation of the said limit speed cam and transmit the same, in the form of angular movement to the maximum allowable Mach pointer through the medium of gear and shaft assemblies 90, 92, 94, 96, 98, 100, 102 and 104 connected therebetween as shown.

Electrical-position transducing means in the nature of synchro means which preferably take the form of an airspeed Syntrol are indicated at 106 and are concentrically disposed as shown adjacent an extremity of main hand staff 50 with the latter being connected directly to the rotor drive shaft 108 of the former, whereby rotation of the said main hand staff will result in exactly the same rotation of the rotor of the airspeed Syntrol 106.

With regard to both altitude Syntrol 80 and airspeed Syntrol 106, it is noted the greatly reduced rotor mass of such devices, as compared to the rotor masses of other synchro means, makes the use of Syntrols most desirable for insuring minimum interference with the respective operations of Mach sub-dial 18 and airspeed pointer 24 and resultant maximum accuracy in the respective operations thereof.

A standard synchro is indicated at 110 and includes a rotor drive gear 112 extending therefrom. A setting marker ring gear is indicated at 114 and includes a command bug support arm 116 extending from a side face 118 thereof. The setting marker ring gear 114 is drivingly connected as shown to the rotor drive gear 112 of standard synchro 110 by meshed gear assemblies 120 and 122 disposed therebetween. Thus, rotation of the said setting marker ring gear will result in angular movement of the command bug 22 relative to the face of airspeed dial 14, and proportional rotation of the rotor of standard synchro 110 as determined by the respective ratios of the gears involved.

An airspeed hold amplifier is indicated at 130 and is powered by a power supply 134 connected as indicated by line 136. As shown power supply 134 is energized by a regulated A.C. supply 132, although regulation of the A.C. is not necessary. However, as a regulated A.C. supply is required elsewhere in the system, as a matter of convenience it is employed to energize power supply 134 as well. The A.C. regulator 132 is used to monitor the excitation of Syntrol 106 to eliminate any effects of the 26 v., 400 c.p.s. line variation on the output of the latter. The reference element is a sine wave, chopper type modulator with a filter driven by the 400 cycle line, and a stable 10 v. D.C. is used as the modulator input. The A.C. output of the modulator is independent of line variation with rejection rate being better than 50 db. The voltage across Syntrol 106 is sampled through a transformer and compared with the reference output of the modulator. The resultant error signal drives a non-illustrated, high gain A.C. amplifier, the output of which is in the series return of Syntrol 106 to maintain the voltage thereacross constant.

Output signals from synchro 110 are fed to series connected pre-amplifier demodulator 129 and modelator 131, as indicated by lines 133 and 135, and from the latter, to an A.C. airspeed hold amplifier 130, as indicated by line 138. The thusly amplified signals are then fed, as indicated by line 140, from the said airspeed hold amplifier to automatic throttle control means, as indicated at 139, and which, per se, form no part of the invention. In addition, the said output signals are also fed to D.C. airspeed hold apparatus 137, as indicated by line 141, and may, if desired, be linearized in, for example, the manner described in detail in the co-pending application for U.S. patent, Ser. No. 557,734 referred to hereinabove. The output signals from synchro 110 are also fed, as indicated by line 143, to failure detector apparatus indicated at 145 of generally conventional construction which function to provide visual indicia to the aircraft crew when the voltage level of the said output signals falls below a predetermined minimum, for example, .050 volt.

The output signals from airspeed Syntrol 106 are fed to each of altitude Syntrol 80 and synchro 110, respectively, as indicated by lines 142, 144 and 146. A Mach number amplifier is indicated at 148 and connected to altitude Syntrol 80 as indicated by line 150.

Phase detector 152, function generator 154, D.C. amplifier-modulator 156 and servo amplifier 158 are connected in series as indicated by lines 153 and 155, and connected to Mach number amplifier 148 as indicated by line 160.

An A.C. gear head motor 162 is provided and connected to the output of servo amplifier 158 as indicated by line 164. A voltage reference is indicated at 168 and a potentiometer at 170, with the two being electrically connected as indicated by line 172. The potentiometer 170 is also connected to the D.C. amplifier-modulator 156 as indicated by line 171 while the voltage reference 168 is also connected to the line source of 26 v., 400 c.p.s. power as indicated by lines 139' and 136, respectively, in FIG. 3.

A linearized Mach output Syntrol is indicated at 174 and includes a geared input shaft 176 extending from the rotor thereof. A.C. gear head motor 162 likewise includes a geared output shaft 178 while potentiometer 170 likewise includes a geared output shaft 180. The respective output shafts 178 and 180 and the input shaft 176 are mechanically connected by gear assemblies 182 and 184 which mesh therewith in the depicted manner.

The linearized Mach output synchro 174 further includes five output wires as indicated at 186, 188, 190 192 and 194 which may be connected, in conventional manner, to the interface of an on-board, air data computer, to thus provide a 5-wire linearized Mach synchro output to the said computer in the manner described in detail hereinbelow.

Means to provide for electrical slewing, or synchronization, of the command bug 22 are indicated generally at 200, it being noted that the said means are of a strictly optional nature and may, if desired, be provided in the form of a retrofit kit for convenient addition thereof to the instrument of the invention without requiring the use of special tools or the performance of any rework or machining operations. Prior to a detailed description of the electrical slewing means 200, it is noted that, if the same are not included in the instrument of the invention as originally supplied, setting knob shaft assembly 25 will be positioned in a non-illustrated, but believed readily apparent, manner wherein the drive gear 208 thereof meshes directly with setting marker ring gear 114 for obvious, command bug adjustment purposes.

Whether provided with the instrument of the invention as originally supplied, or furnished later in the form of a retrofit kit, the command bug electrical slewing means 200 will comprise a dual input mechanical differential 201 which includes geared input shafts 202 and 204, respectively, extending as shown from opposite extremities thereof, and an output gear 206 extending as shown from a central portion thereof. The setting knob shaft assembly drive gear 208 is drivingly meshed as shown with input gear 202 of the dual input mechanical differential 200. An airspeed hold gear head motor is indicated at 210 and includes a geared output shaft 212 which is drivingly meshed as shown with input gear 204 of the said differential. A slip clutch is indicated at 214 and is disposed as shown between output gear 206 and setting marker ring gear 114, and functions to transmit rotation therebetween. The output from automatic throttle control means 139 may be fed to both the control and fixed phases of the airspeed hold motor 210 as indicated by lines 216 and 218.

The output from power supply 134 is indicated in FIG. 2 by the arrow extending therefrom, and may be seen in the said FIG. to be fed to each of airspeed hold amplifier 130, A.C. servo amplifier 158, phase detector 152 and function generator 154, respectively, as indicated by the correspondingly identified arrowheads extending thereto. Gear head motor 162 is powered by raw A.C. in non-illustrated manner.

For use in a high speed aircraft, the encased instrument of the invention would be mounted in conventional manner in the instrument panel of the said aircraft and the necessary electrical and pneumatic connections made thereto to provide the requisite electrical power, and static and impact pressure signals to the said instrument. In addition, command bug 22 may be readily adjusted relative to the face of airspeed dial 14 through manual rotation of setting knob shaft assembly 25 to indicate a desired airspeed. Thus, as the aircraft gains speed upon take-off, the ensuing increase in the impact pressure transmitted from the pressure sensing pitot assembly 28 to the airspeed diaphragm 32 will result in expansion of the latter and corresponding rotation of airspeed sector shaft 42 in the counter-clockwise direction under the influence of biasing spring 51.

This counter-clockwise rotation of the airspeed sector shaft will be transmitted to main hand staff 50 through the medium of meshed gear sector 46 and driven gear 48 to result in clockwise rotation of the said main hand staff and resultant angular movement of airspeed pointer 24 relative to the face of airspeed dial 14 to indicate the increase in airspeed.

Concurrently, as the aircraft gains altitude the ambient pressure to which the outer surfaces of evacuated aneroid diaphragm 60 are exposed will of course decrease whereupon the said diaphragm will expand with resultant clockwise rotation of shaft 66 through the medium of motion transmitted arm 62 connected therebetween. The corresponding rotation of gear segment 70 which is attached to the said shaft will result in counter-clockwise rotation of hollow shaft 52, whereupon the Mach sub-dial 18 will be rotated in the counter-clockwise direction relative to the face of airspeed dial 14 to thus reflect the decrease in indicated airspeed for a given Mach number as the aircraft gains altitude. Naturally, Mach number is indicated by the Mach sub-dial indicia and the airspeed pointer, the latter pointing to the appropriate Mach number indicia for the indicated airspeed and measured altitude. At the same time the airspeed pointer, in cooperation with the airspeed indicia, indicates the airspeed of the craft. It is believed readily apparent that should airspeed and/or altitude decrease, rather than increase, operation of airspeed pointer 24 and/or Mach sub-dial 18 relative to the face of airspeed dial 14 will occur in the manner opposite to that described immediately hereinabove to provide accurate indication of the said decreases.

The rotation of shaft 52 which results in rotation of Mach sub-dial 18 relative to airspeed dial 14 will also result in the same rotation of the max. allowable airspeed cam 86 which is affixed to the said shaft, it being noted that the said cam 86 is profiled to meet the requirements of the $V_{mo}$–$M_{mo}$ curve specified for the particular aircraft in which the system of the invention is installed. This rotation of the max. allowable airspeed cam will result in the changes in the profile thereof being picked up by the rollered cam follower 88 and being transmitted, via the interposed shaft and gearing arrangements, to the maximum allowable airspeed pointer 20 to give a continuous indication of the maximum allowable airspeed at the altitude at which the aircraft is then flying.

Thus, is believed made readily apparent whereby the instrument of the invention functions to provide, through the use of a single dial presentation, simultaneous indication of airspeed, the Mach number equivalent thereto at the altitude at which the aircraft is flying, and the Mach number which is equivalent to the maximum allowable airspeed at the said altitude.

The back-to-back arrangement of airspeed Syntrol 106 and standard synchro 110 will function to provide an airspeed error signal output whenever the airspeed deviates from the pre-selected speed as indicated by the position of the command bug 22 relative to the face of airspeed dial 14. This is accomplished by the direct pickup of airspeed signals off the main hand staff 50 by the said airspeed Syntrol as a result of the direct connection therebetween.

In operation, the said airspeed signals are fed from airspeed Syntrol 106 to standard synchro 110 by lines 142 and 144, from the said standard synchro to the airspeed hold amplifier 130, by line 138, and from the said hold amplifier to the automatic throttle control means 139 by line 140. For some applications of the Mach/airspeed instrument of this invention, means may be included therein to linearize these airspeed error signals prior to the introduction thereof to the automatic control means, and the said error signal linearizing means will preferably take the form disclosed in my copending application for U.S. patent, Ser. No. 557,734, filed June 15, 1966, now Patent No. 3,376,743 and assigned to the assignee hereof. Under optimum conditions, for example, with the command bug 22 set at 300 knots and the airspeed pointer 24 indicating 300 knots, the airspeer Syntrol 106 will be at null with respect to the standard synchro 110. Thus, the airspeed error signals to the automatic throttle control means 139 will be zero.

Should this coincidence between airspeed and command bug indication change, as for example, through the manual rotation of the setting knob shaft assembly 25 to rotate the command bug to a 250 knot setting, the rotor of standard synchro 110 will be repositioned, through the interrelated action of input gear 202 and output gear 206 of differential 200, slip clutch 214, setting marker ring gear 114, gear assemblies 120 and 122, and the geared input shaft 112 of the said standard synchro, to result in the creation of an error signal of a sense and magnitude that is proportional to the change in command bug setting. The sense and magnitude of this error signal is then transmitted as described hereinabove to the automatic throttle control means 139 which, being activated, will automaticaly down-throttle until such time as airspeed has decreased sufficiently so that the airspeed pointer 24 becomes re-aligned with the command bug 22 at 250 knots.

At this point, the rotor of the airspeed Syntrol 106 will have been repositioned by virtue of its direct connection to main hand staff 50 and the counter-clockwise rotation of the latter attendant the change in airspeed from 300 to 250 knots. Thus, the airspeed Syntrol 106 will again be at null with respect to the standard synchro 110 to result in the discontinuance of the airspeed error signal to the automatic throttle control means 139. With the linearity of the airspeed dial graduations in the expanded range (60–180 knots), this automatic throttle control feature should prove of great value in the take-off mode.

For purposes of providing a linearized Mach signal, the mathematical derivation of Mach number is accomplished in the followng manner. Since the angular rotation of the airspeed pointer 24 is proportional to the logarithm of the airspeed $q_c$, and the angular rotation of the Mach sub-dial 18 is proportional to the logarithm of the static pressure $p_s$, with Mach being proportional to the difference between these two logarithms, the logarithm of $q_c/p_s$ which is proportional to the logarithm of the Mach number, may be derived. As a result, the Mach subdial 18 is calibrated to read directly in Mach number.

As believed made clear hereinabove, the actuating forces within the system of the invention are provided by the movement of airspeed diaphragm 32 and the evacuated aneroid diaphragm 60. The airspeed diaphragm 32 senses impact pressure, which is transmitted thereto from pitot assembly 28 through connecting tube 30, and translates this, by virtue of the described direct mechanical linkage, to produce angular rotation of the rotor of airspeed Syntrol 106, with the magnitude of such rotation being proportional to the logarithm of $q_c$.

On the other hand, the evacuated aneroid diaphragm 60 senses static pressure changes, occasioned by changes in aircraft altitude, which static pressure changes are introduced to the interior of the case 12 (see FIG. 1) through suitable static pressure connection means. These static pressure changes are translated by the said aneroid diaphragm into angular rotation of the rotor of altitude Syntrol 80, with the magnitude of such angular rotation being proportional to the logarithm of $p_s$.

Since each of airpseed Syntrol 106 and altitude Syntrol 80 acts as an electrical-position transducing means which produces a three-wire synchro type output, as indicated at 109 and 81, respectively, in FIG. 3, proportional to the respective shaft angle parameter thereof, the electrical connection of the said Syntrols in the described manner and the application of excitation to the airspeed Syntrol 106, from the 26 v., 400 c.p.s. line source as indicated by line 107 in FIG. 3, will result in an electrical output from the altitude Syntrol 80 which is proportional to the sine function of the difference between the respective shaft angles, namely $\theta_{qc}-\theta_{ps}$. In addition, since $\theta_{qc}$ is proportional to the logarithm of $q_c$ and $\theta_{ps}$ is proportional to the logarithm of $p_s$, the resultant electrical output from the said altitude Syntrol will be proportional to the sine of log $qc/ps$ or, more simply, the sine of log M, where M is equal to the Mach number.

This electrical output, or Mach signal, is fed from the said altitude Syntrol to the Mach number amplifier 148 as indicated by line 150 for increase in the level of the said signal, it being noted that the said amplifier is of the high gain operational type and is adjusted for very high stability. A capacitor placed across the feedback functions to adjust for proper phasing of the Mach signal.

After amplification, the resultant Mach signal is fed to the phase detector 152, as indicated by line 160, for conversion to D.C. and demodulation. This demodulation is accomplished in the said phase detector through the use of a phase sensitive "chopper" which responds to the in-phase fundamental component of the combined airspeed and altitude Syntrol output signal, with the said demodulator being extremely linear with signal input and responsive to the cosine of the angle between signal and reference.

From the phase detector 152, the signal is fed to the function generator 154, as indicated by line 153, with the function generator designed to produce a D.C. output which is directly proportional to the Mach number. The said function generator is preferably of the transistor type (although other types such as a diode type may be used) and is used to generate the complete range of 0.3 to 1.0 Mach corresponding to the difference angles of the respective Syntrols 106 and 80. The resultant output curve is relatively smooth and, although the ratio of the maximum to minimum slope is approximately 3.5, the function can be generated accurately to within 0.001 Mach with nine break points. For purposes of temperature compensation, break point references are furnished through transistors so connected that the diode and transistor drops will track-over temperature.

The output from the function generator 154 is supplied to a positional follow up servo mechanism indicated generally by the reference numeral 159. Specifically, the output from the output from the function generator 154 is supplied to a differential amplifier modulator 156, by conductor 155, which forms part of the positional follow up servo mechanism 159. The output of differential amplifier modulator 156 which is derived as will be described below, is amplified by servo power amplifier 158 and supplied to A.C. servo motor 162. Through gears 178, 184, 182 and 180, the slide of potentiometer 170 is moved in accordance with rotation of servo motor 162 and hence in accordance with linearized Mach number.

The potentiometer winding is energized by a reference voltage from source 168. Accordingly the output from potentiometer 170 is a function of slide position which, as already noted, is a function of the output of function generator 154. The potentiometer output is applied to differential amplifier 156 through conductor 171 where the output is compared with the output of the function generator. The error signal resulting from this comparison is amplified by differential amplifier modulator 156, is chopped thereby and becomes the output applied to conductor 157. Thus, positioned follow up servo mechanism 159 provides for a feedback to bring the position of the potentiometer slide into agreement with linearized Mach number.

To obtain the desired five wire output 186, 188, 190, 192, and 194, all that need be done is to connect Syntrol 174 to gear 184 through a gear 176 to compensate for scale factor. Thus the system is readily mateable with existing air data computers.

The amplifier portion of the D.C. amplifier-modulator 156 is a low drift D.C. differential operational amplifier so as to provide high resistance and constant loading on the function generator 154, and the modulator portion thereof is a solid state "chopper" which converts D.C. to A.C. to drive the A.C. servo amplifier 158 and thus eliminate effects of D.C. signal drift.

The servo amplifier 158 drives the center tapped, control phase winding of the A.C. servo gear head motor to provide a combined loop gain of better than 10,000 for a negligible follow-up error.

Referring now to the somewhat modified system of FIG. 4, the same differs from the system of FIG. 3 primarily through the elimination of the function generator 154, and its attendant phase detector 152, and the replacement thereof, and of potentiometer 170, by a nonlinear function potentiometer 252 which is energized from voltage reference 168 as indicated by line 172. The function potentiometer 252 operates to provide an output signal in the nature of a feedback which is modified in accordance with the function being operated on, here the function of Mach number, to D.C. amplifier modulator 156 as indicated by line 171. Thus is believed made clear whereby the activities of the function generator 154 of the system of FIG. 3 are taken over by the nonlinear function potentiometer 252 in the system of FIG. 4 so that the feedback signals applied to D.C. amplifier modulator 156 by the said function potentiometer are in accordance with the same function as provided heretofore by the said function generator.

The geared output shaft of the function potentiometer 252 as indicated by the dashed line 254 in FIG. 4, is mechanically connected to the geared input shaft 176 of the linearized Mach output Syntrol 174 in the manner of the geared output shaft 180 of potentiometer 170 of the system of FIG. 3.

The transformer secondary of the function potentiometer 252 is centertapped, and the latter is tapped to eliminate signal ambiguity which might otherwise arise at null.

The replacement of the function generator 154 by the function potentiometer 252 makes possible the elimination, if desired, of the A.C. regulator 132 (FIG. 3) from the system since the same voltage is now applied to the Syntrols and function potentiometer, respectively, and will thus be self compensating provided, of course, that the respective Syntrols and function potentiometer are excited from the same voltage source.

In operation, the somewhat modified system of FIG. 4 would, of course, function in the manner of the system of FIGS. 2 and 3 to provide, in the end result, a five wire type, linearized Mach output from output Syntrol 174.

Figure 5:
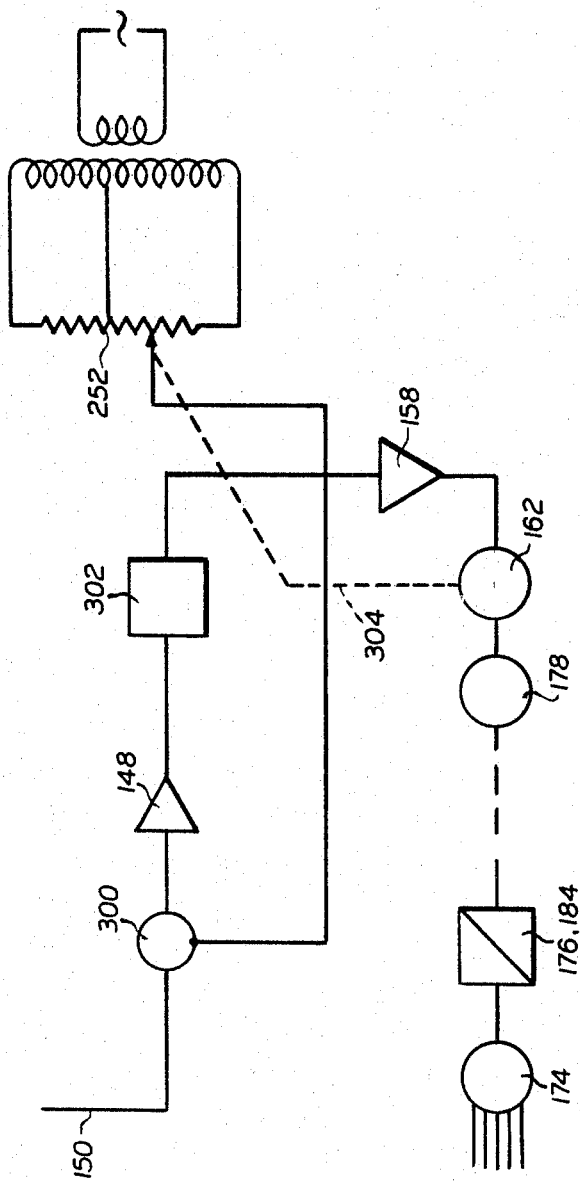
FIG. 5 is a view similar to FIG. 4 showing still another modification.

Referring now to FIG. 5, another modification of means for generating the linearized output function is disclosed which is similar to FIG. 4 but differs therefrom in that it is an A.C. system rather than a D.C. system. The use of A.C. eliminates the need for any regulation of D.C. signals. Specifically, as is true in FIG. 4, a function potentiometer 252 is employed in lieu of the function generator 154 of FIG. 3. The output of function potentiometer 252 is combined with the output from Syntrol 80 at a summing junction 300 and the resulting combined signal is amplified by amplifier 148 and then applied to a quadrature rejecting means 302 which may, for example, be a modulator-demodulator. The output of the quadrature rejecting means 302 is applied to the servo amplifier 158, the output of which is applied to the gear head motor 162. The gear head motor, in addition to driving the output synchro 174 through gearing 176–184, is also coupled by suitable mechanical means shown by dotted line 304 to the slide of function potentiometer 252 whereby to operate said slide inaccordance with the servo output.

As was true in FIG. 4, the output from the function potentiometer 252 serves as a feedback signal which is combined at the summing junction 300 with the output of Syntrol 80 to yield a signal in accordance with the Mach number of the aircraft.

Thus it is believed made clear whereby the instrument of the invention functions, in full accordance with the stated primary object thereof, to provide a linearized, electrical Mach output to mate with an existing air data computer interference.

Electrical slewing of the command bug 22 is accomplished through the provision of signals from the automatic control means 139 to supply both the control and fixed phases of airspeed hold motor 210 and resultant rotation of the geared output shaft 212 of the latter, with attendant rotation of the input gear 204 of dual input differential 201, to thus modify the mechanical output charasteristics thereof.

While we have herein shown and described the preferred form of the present invention and have suggested modifications thereof, other changes and modifications may be made therein without departing from the spirit and scope of this invention.

What I claim is:

1. In an aircraft instrument means for generating an electrical signal which is proportional to a function of M wherein M is Mach number, said signal generating means comprising a first electrical-position transducing means having a pair of relatively movable parts, the output of said first electrical-position transducing means being a function of the relative positions of said pair of relatively movable parts, airspeed responsive means, means for drivingly connecting said airspeed responsive means to one of said parts of said first transducing means for positioning said one of said parts in accordance with airspeed, a second electrical-position transducing means having a pair of relatively movable parts, the output of said second electrical-position transducing means being a function of the relative positions of said pair of relatively movable parts, altitude responsive means, means for drivingly connecting said altitude responsive means to one of said parts of said second transducing means for positioning said one of said parts of said second electrical-position transducing means in accordance with altitude, and means electrically connecting said first and second electrical-position transducing means in such manner the excitation of said first electrical-position transducing means will result in an electrical output from said second electrical-position transducing means which is proportional to a function of, and means connected to the output of said second electrical-position transducing means for linearizing the electrical output therefrom.

2. In an aircraft instrument as in claim 1. wherein, said means for electrically connecting said first and second electrical-position transducing means connects the output from said first electrical-position transducing means to said second electrical-position transducing means.

3. In an aircraft instrument as in claim 1, wherein both of said electrical-position transducing means are synchro means with said one parts thereof being rotors and said other parts thereof being stators.

4. In an aircraft instrument as in claim 3, wherein, both of said synchro means are Syntrols.

5. In an aircraft instrument as in claim 3 wherein, said airspeed responsive means comprise impact pressure responsive means which are operable to rotate the rotor of said first synchro means in response to changes in airspeed, and said altitude responsive means comprise static pressure responsive means which are operable to rotate the rotor of said second synchro means in response to changes in altitude.

6. In an aircraft instrument as in claim 1 wherein, said means for linearizing said signal comprises a phase detector operatively connected to the output of said second transducing means and to a reference input for producing a D.C. output which is a function of the output of said input from said second transducing means, and function generator means connected to the output of said phase detector for linearizing same.

7. In an aircraft instrument as in claim 6, wherein, an amplifier is interposed in the connection between said second transducing means and said phase detector.

8. In an aircraft instrument as in claim 6 wherein, said phase detector means include phase sensitive "chopper" modulator means responsive to that portion of the fundamental of the input from said second transducing means that is in phase with said reference voltage.

9. In an aircraft instrument as in claim 8 wherein, the amplifier portion of said D.C. amplifier-modulator comprises a low-drift D.C. differential operational amplifier to provide high resistance and constant loading on said function generator, and the modulator portion thereof comprises said "chopper" means for converting D.C. to A.C. to drive said A.C. servo amplifier.

10. In an aircraft instrument as in claim 9 wherein, said output synchro means comprise a rotor and a stator, and means for mechanically connecting said gear head motor in driving relation with said potentiometer and said rotor.

11. In an aircraft instrument as in claim 10 wherein, said output synchro means include means for producing a five-wire synchro type output.

12. In an aircraft instrument as in claim 1, further comprising, output synchro means for producing a synchro output, and means for connecting said signal linearizing means to said output synchro means, whereby a synchro type output representative of said linearized Mach signal is produced by said output synchro means.

13. In an aircraft instrument as in claim 12 wherein, said means for connecting said Mach signal linearizing means to said output synchro means comprise a positional follow-up servo mechanism.

14. In an aircraft mechanism as in claim 13 wherein, said positional follow-up servo mechanism comprises an amplifier-modulator connected to the output of said function generator, a servo amplifier connected to the output of said amplifier-modulator, a gear head motor connected to the output of said amplifier, a potentiometer having a movable slide, means connecting said motor to said movable slide, a source of reference voltage connected to said potentiometer, means connecting the output of said potentiometer to said amplifier-modulator, and means for drivingly connecting said motor to said output synchro means.

15. In an aircraft instrument as in claim 1 further comprising, means for simultaneously visually displaying airspeed, Mach number and maximum allowable airspeed in Mach number, said last mentioned means including relatively movable airspeed and Mach number indicia means, a pointer, means for connecting said pointer to said airspeed responsive means for moving said pointer relative to both of said indicia means for simultaneously indicating airspeed and Mach number thereby, another pointer for indicating maximum allowable speed, and means for connecting said other pointer to said altitude responsive means for moving said other pointer relative to said Mach number indicia means for indicating maximum allowable speed in Mach number thereon, and means connected to said altitude responsive means and to said Mach number indicia means for moving said Mach number indicia means relative to said airspeed indicia means in response to changes in said altitude.

16. In an aircraft instrument as in claim 15 wherein, said means for moving said Mach indicia means comprise means for rotating said Mach indicia means in response to changes in altitude, and said means for moving said other pointer comprise means for rotating said other pointer in response to changes in altitude.

17. In an aircraft instrument as in claim 15 wherein, said means for rotating said other pointer comprise cam means which are profiled in accordance with the $V_{mo}$–$M_{mo}$ curve specified for the aircraft in which the instrument is installed.

18. In an aircraft instrument as defined in claim 15, further comprising a command bug in juxtaposition with said airspeed indicia means, means for moving said command bug relative to said airspeed indicia means, a third electrical position transducing means having a pair of relatively movable parts, means for positioning one of said parts of said third transducing means in accordance with the position of said command bug, and means for electrically connecting said first and third transducing means for producing a signal dependent on the positional difference between said pointer and said command bug.

19. In an aircraft instrument as in claim 1, wherein said means for linearizing said signal comprises an amplifier-modulator having two input means, one of said input means being connected to the output of said second transducing means, a function potentiometer including input means, output means, and a movable member, said potentiometer input means for connection with a source of reference voltage, means for connecting said potentiometer output means to the other input means for said amplifier-modulator, a motor connected to the output of said amplifier-modulator and electrically driven thereby, and means for connecting said motor outptut to said potentiometer movable member for moving same for producing a potentiometer output in accordance with the position of said movable member.

20. In an aircraft instrument as in claim 19, further comprising output synchro means including a rotor and a stator, and means for connecting said motor to said synchro means' rotor.

References Cited

UNITED STATES PATENTS

| 3,049,007 | 8/1962 | Joline | 73—182 |
| 3,232,530 | 2/1966 | Ricke et al. | 73—182 XR |
| 3,257,845 | 6/1966 | Andresen et al. | 73—182 |
| 3,312,110 | 4/1967 | Armstrong | 73—182 XR |

FOREIGN PATENTS

| 766,873 | 1/1957 | Great Britain. |
| 1,031,253 | 6/1966 | Great Britain. |

LOUIS R. PRINCE, *Primary Examiner.*

DONALD O. WOODIEL, *Assistant Examiner.*

U.S. Cl. X.R.

116—129

PO-1050
(5/69)

UNITED STATES PATENT OFFICE
CERTIFICATE OF CORRECTION

Patent No. 3,453,883    Dated   July 8, 1969

Inventor(s) Vincent P. Caggia

It is certified that error appears in the above-identified patent and that said Letters Patent are hereby corrected as shown below:

Col. 4, line 16: Change "modeulator" to -- modulator --.
Col. 6, line 54: Change "speer" to -- speed --. Col. 8, line 24: Delete "the output from", first instance; line 45: Delete "positioned" and substitute therefor -- positional --.
Col. 9, line 62: Delete "interference" and substitute therefor -- interface --; line 70: Change "charasteristics" to -- characteristics --. Column 10, line 23: Delete "the" and substitute therefor -- that --.; line 26: After "of" and before the comma (,), insert -- M --.

SIGNED AND
SEALED
MAR 3 1 1970

(SEAL)
Attest:

Edward M. Fletcher, Jr.
Attesting Officer

WILLIAM E. SCHUYLER, JR.
Commissioner of Patents